(No Model.)
J. H. RUDOLPH.
MACHINE FOR SAWING SLATE.
No. 357,133. Patented Feb. 1, 1887.
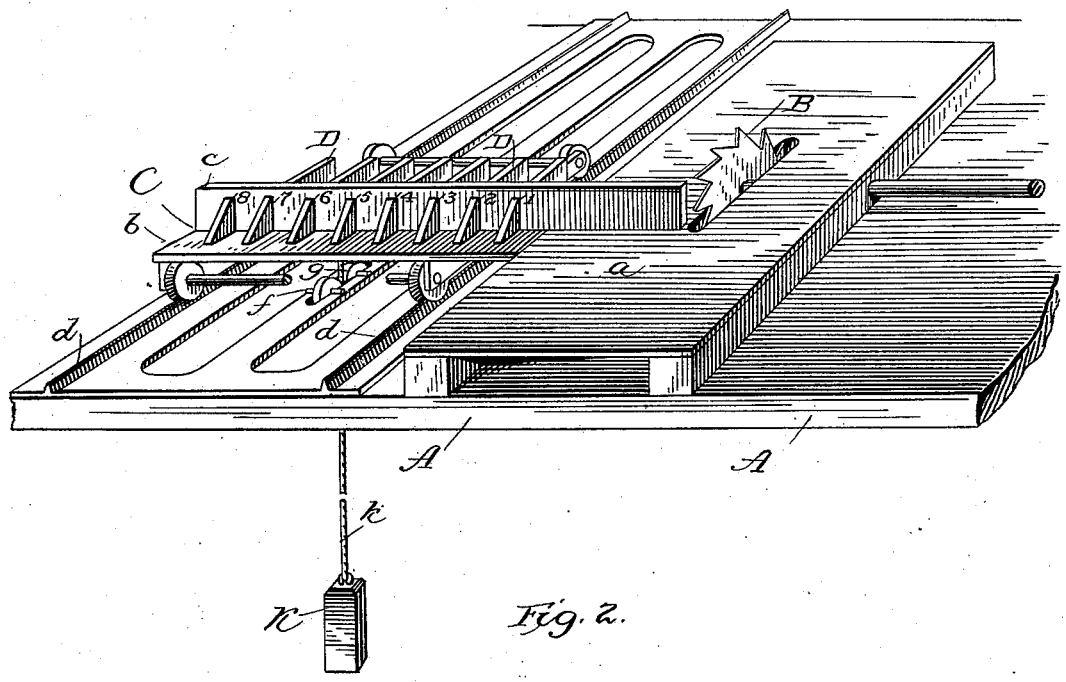
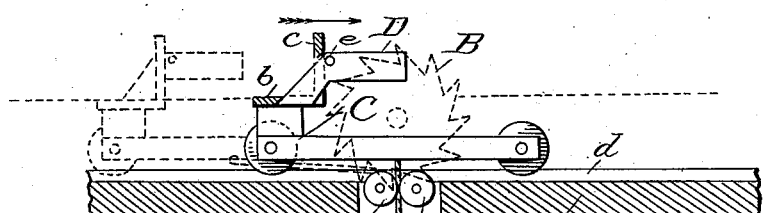
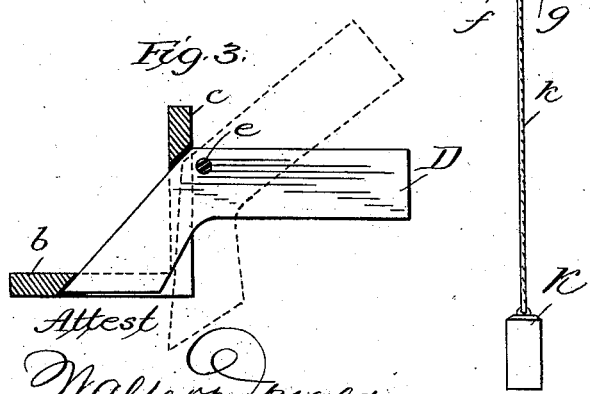
Attest
Walter Donaldson
F. L. Middleton
Inventor
Justus H. Rudolph
by Joyce & Spear
Attys
N. PETERS, Photo-Lithographer, Washington, D. C.

UNITED STATES PATENT OFFICE.

JUSTUS H. RUDOLPH, OF WALNUTPORT, PENNSYLVANIA.

MACHINE FOR SAWING SLATE.

SPECIFICATION forming part of Letters Patent No. 357,133, dated February 1, 1887.

Application filed November 23, 1885. Serial No. 183,718. (No model.)

*To all whom it may concern:*

Be it known that I, JUSTUS H. RUDOLPH, of Walnutport, in the county of Northampton and State of Pennsylvania, have invented a new and useful Improvement in Machines for Sawing Slate; and I do hereby declare that the following is a full, clear, and exact description of the same.

My invention is an improved machine for sawing school-slates and reducing them to proper size and shape.

The improvements relate, first, to the gaging mechanism, and, second, to means for returning and stopping the carriage upon its return.

The object of my invention is to provide automatically-operating gages adapted to any desired size of slate, and so combined with the carriage that they will adjust themselves to the slate when it is placed upon the carriage, whatever may be the size of the slate which is to be sawed.

In the accompanying drawings, Figure 1 is a perspective view. Fig. 2 is a section from front to rear, taken through the table. Fig. 3 shows a cross-section of the carriage by the side of one of the gages.

In the drawings, A represents a suitable table or bed, and B an ordinary saw for sawing slates, which are fed to the saw on the raised table $a$. The carriage C consists of a bottom plate, $b$, and a guiding-flange, $c$, set in vertical plane and extending across the raised table $a$ near the saw. The bottom plate, $b$, of the carriage is on the same horizontal plane with the raised table $a$. The bottom plate, $b$, is supported by suitable hangers upon grooved wheels, which run on V-shaped tracks $d$ in line parallel with the saw. The carriage is cut with kerfs in planes parallel with the track diagonally from the lower front corner into the bottom plate, $b$, and flange $c$. These kerfs are cut at points in the carriage distant from the saw corresponding to the various sizes of slates. In the drawings that nearest to the saw is distant from the saw by a space equal to the smallest size of slate to be sawed; the second, the second length; the third, the third length, and so on in order to the eighth, which measures the greatest. In these kerfs are pivoted gages D, in form as shown more plainly in Fig. 3. These are preferably made of sheet metal, with an inclined front edge and rearwardly-extending part of any convenient shape. They are pivoted at $e$ upon a vertical flange, $c$, and on its rear face, so that in its normal position the toe of the gage bears against the end of the kerf in the bottom plate, $b$, as shown in full lines in Fig. 3. The rear part is of sufficient weight to hold the gage in position, as shown in full lines in Fig. 3, and when pressed from the front the gage is thrown backward and upward in the position shown in dotted lines in the same figure, in which position the gage is out of the way of the slate and allows it to be pressed against the vertical flange $c$.

The shape of the gages and the point where they are pivoted are not material, the essential feature being that they shall be so arranged and pivoted that in their normal position they will be in place to act as gages, but may yield and be pushed out of the way when the slate is in position to be sawed and extends farther from the plate than the distance of the gage which is to be displaced.

It will be understood that the flange $c$, which is at right angles to the side of the saw, serves to guide the slate as it is fed to the saw, the slate resting partly on the raised table $a$ and partly upon the bottom piece, $b$, of the carriage. This allows the operator to grasp the edge of the slate with his left hand, as he cannot do when the slate lies entirely upon the table or bed.

In operating the machine, if the smallest size of slate is to be cut, none of the gages is displaced; but the front edge rests against the flange $c$ and the edge on the left hand against the gage 1. In sawing the second size the front edge of the slate will be pressed against the inclined edge of the first gage and will push it back, and will be brought against gage 2, which remains in place and determines the position of the slate. The third size of slate will push back the first and second, and its left-hand edge will be stopped by the third gage, and so on in succession. All the gages up to that which determines the size of the slate retreat from the kerfs and allow the others to remain in place. The operator moves the carriage wholly or partly by pushing the slate against the flange $c$, and thus insures that it shall always be in proper place. The carriage is returned after the sawing is completed by means of a weight, K, and rope $k$, the rope passing between pulleys $f$ and $g$. The pulleys $f$ $g$ are located one upon either side of the weighted cord, and in the forward movement of the carriage the pulley $f$ serves as a guide for the rope. When the carriage has been pushed to its fullest extent, the weight will return it back to the place of starting, and it will be returned with such momentum that it is necessary to provide some means for taking up the shock.

As free movement of the carriage over the top of the frame is desirable, no fixed stop is provided; but I take up the shock of the returning carriage by providing the pulley $g$ upon the side of the rope opposite to that of the pulley $f$. This pulley $g$ serves as a buffer and takes up whatever strain there may be upon the parts, gradually stopping the carriage in its return movement and bringing it back to its normal condition.

I claim as my invention—

1. In combination with a saw and its table, the traveling carriage adapted to receive and hold the slates to be cut, and having a series of gages pivoted thereon and moving therewith, substantially as described.

2. In combination with a fixed saw, the raised table $a$, the traveling carriage having the bottom plate, $b$, in the same horizontal plane with the table $a$, the vertical flange $c$, extending from said plate $b$, and a series of gages pivoted upon said vertical flange, said gages being adapted to allow of different sizes of slates being cut, substantially as described.

3. In combination with the table having the bottom plate, $b$, and vertical flange $c$, the series of yielding pivoted gages D, set in kerfs in the carriage, substantially as described.

In testimony whereof I have signed my name to this specification in the presence of two subscribing witnesses.

JUSTUS H. RUDOLPH.

Witnesses:
F. L. MIDDLETON,
C. S. STURTEVANT.